Sept. 27, 1966  M. A. MacDONALD  3,275,191
ARTICLE-FEED APPARATUS HAVING AN ARTICLE
TRANSFER MEANS AND FLUID MEANS TO
PROPEL ARTICLES THROUGH A TUBE
Filed June 29, 1965  3 Sheets-Sheet 1

INVENTOR.
MURDO A. MacDONALD
BY
Barnes, Kisselle, Raisch & Choate
ATTORNEYS

INVENTOR.
MURDO A. MacDONALD
BY
Barnes, Kisselle, Raisch & Choate
ATTORNEYS

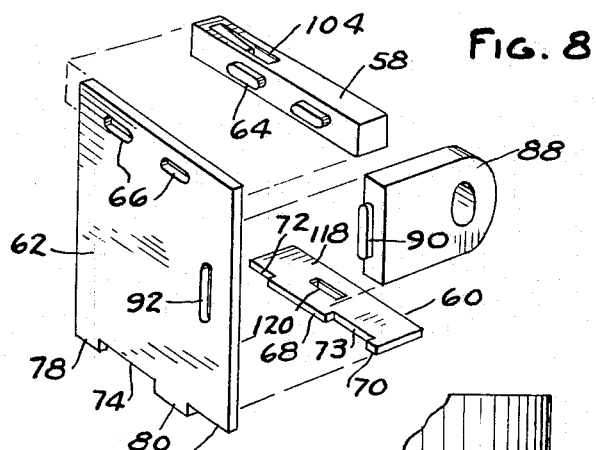
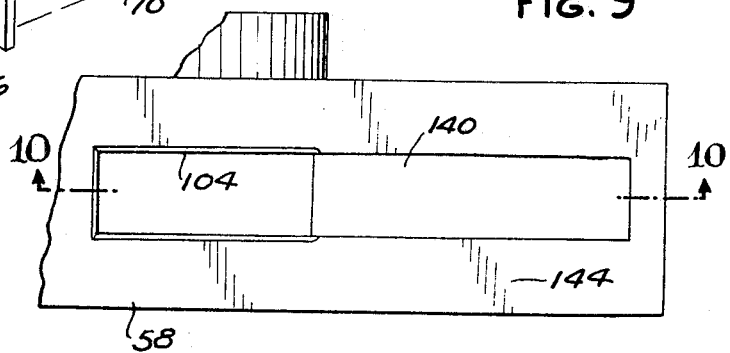
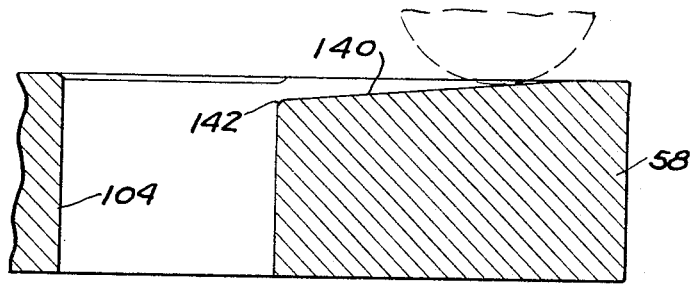
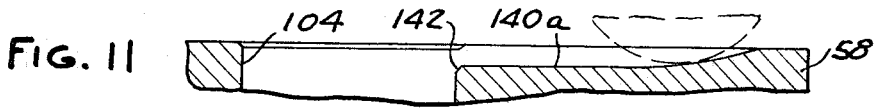
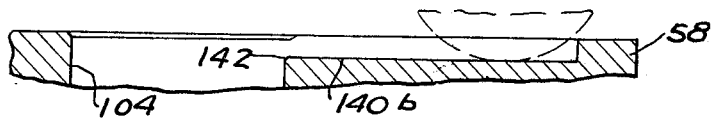

United States Patent Office 3,275,191
Patented Sept. 27, 1966

3,275,191
ARTICLE-FEED APPARATUS HAVING AN ARTICLE TRANSFER MEANS AND FLUID MEANS TO PROPEL ARTICLES THROUGH A TUBE
Murdo A. MacDonald, Bloomfield Hills, Mich., assignor to Tru-Tork, Inc., Birmingham, Mich., a corporation of Michigan
Filed June 29, 1965, Ser. No. 467,866
12 Claims. (Cl. 221—175)

This invention relates generally to apparatus for feeding articles such as nuts, washers, and the like one at a time upon demand in a predetermined orientation from a source to a desired delivery point. The apparatus is especially well adapted for delivering articles from floor-level hoppers through tortuous paths to various kinds of equipment used in modern-day automated manufacturing lines, and the delivery point may be either moving or stationary.

It is conventional in certain industrial plants to gravity feed some parts which are easily orientable and easily fed, such as relatively large, heavy nuts, from overhead hoppers through rigid tracks to automated machinery. This system is objectionable in that the hoppers must usually be relatively high in the air, for example, 15' to 18' or more, which requires space-consuming supporting structure and also physical labor in carrying supplies of nuts to the hoppers. Because of frictional track resistance, these gravity-feed systems are in general unsatisfactory for feeding parts over relatively long distances or through curved paths, especially where the parts are small or light-weight or of unusual shape which are hard to deliver in a predetermined attitude.

Some attempts have been made to feed parts to automated equipment by means of compressed air, but conventional article-feeding devices of this type have not been sufficiently reliable for use in continuous, relatively high-speed automated production lines wherein a single failure of the feeding device can result in shutting down the entire production line. A primary defect in conventional apparatus is that the articles being fed therethrough frequently tilt or cock and catch on surfaces defining the track or passageway involved and fail to reach the delivery point. Another difficulty lies in controlling the attitude of the articles. These two difficulties compound each other. A third difficulty is that under compressed-air delivery, the article sometimes attains too great a velocity, resulting in damage to the article, or the equipment to which it is delivered, on impact at the delivery point.

The general object of this invention is to provide a relatively simple, inexpensive feeder structure improved to deliver articles from a floor-level hopper in a predetermined attitude one at a time upon demand through a tortuous path, if required, to a delivery point which may be either moving or stationary and to function through thousands of successive cycles with sufficient reliability and rapidity to meet the demands of relatively high-speed, continuously-operating automated production lines. A more specific object of the invention is to provide such a structure for feeding parts having a basically disc-like configuration such as nuts, washers, nut-and-washer combinations, ferrules, slugs, and the like.

Generally, the invention contemplates the use of a hopper-fed track which receives a series of the parts in a predetermined attitude. A shuttle transfers the parts one at a time from the track to an adjacent, relatively short guideway into which the part drops. A gate momentarily stops movement of the part in the guideway and then releases it so that it drops a short distance into a pneumatic tube while the shuttle returns to the track for another article. In the subsequent cycle, air under pressure is introduced into the tube for propelling the part therein to the delivery point, and the gate forms a valve pneumatically closing the guideway to contain the air under pressure.

The guideway, shuttle, and portions of the track have relatively close tolerance with respect to articles passing therethrough to maintain them in their predetermined attitude. The pneumatic tube has greater tolerances so that it can be bent around corners without binding on a part passing therethrough and so that some of the propelling air escapes past the part to avoid undue velocity of the part at its delivery point. Means are provided for controlling the influence of the shuttle on the series of parts remaining in the track as the shuttle reciprocates. One form of the invention is illustrated in the accompanying drawings:

FIG. 8 is an exploded perspective view illustrating the relation between four moving parts in the feeder device.

FIG. 9 is an enlarged, fragmentary, top plan view of the shuttle.

FIG. 10 is a partly diagrammatic, sectional view on line 10—10 of FIG. 9.

FIG. 11 is a fragmentary view similar to FIG. 10 showing a modified construction.

FIG. 12 is similar to FIG. 11 but shows another modified construction.

Figure 1:
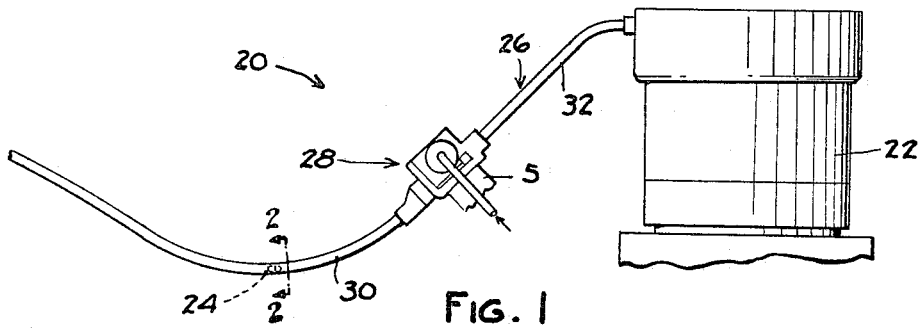
FIG. 1 is a generally diagrammatic side elevation of a feeding system incorporating the present invention.

Shown in the drawings is a feeding system 20 incorporating the present invention and including a hopper 22 which introduces a series of parts 24 in a predetermined attitude into a track 26. Track 26 is connected to a feeder device 28 which transfers articles 24 one at a time upon demand into a pneumatic tube 30 and introduces air under pressure into the tube for propelling an article therein to a delivery point. The parts are maintained in their predetermined attitude during their transfer into tube 30 and while they are travelling through the tube.

Figure 2:
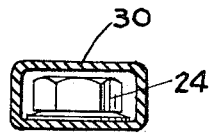
FIG. 2 is an enlarged selectional view on line 2—2 of FIG. 1.

Hopper 22 is illustrated as being of the vibratory type, although the system is equally well adapted to the use of other types of hoppers such as rotary types and oscillating types. In the form of the invention illustrated, track 26 includes a flexible, tubular upstream portion 32 connected to the hopper and to a substantially inflexible track portion 34 formed on the body 36 of feeder device 28. The use of flexible tube 32 is particularly advantageous in connection with the vibratory hopper shown, since the hopper must be left free to vibrate unobstructedly in order to function properly. Tube 32 can have the same sectional configuration as tube 30 (see FIG. 2), the features of which are discussed in detail below. A suitable material for tubes 30 and 32 is a plastic material marketed under the name Tygon.

Figure 4:
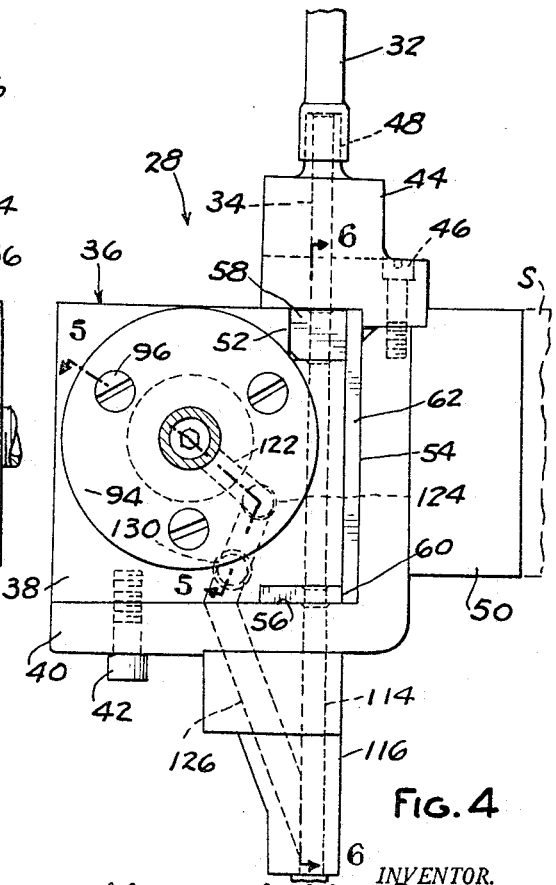
FIG. 4 is, in general, a side elevation of the feeding device.

Feeder body 36 includes a block 38 and an L-shaped bracket 40 secured together as by bolting 42, and a cap 44 secured to bracket 40 by bolting 46. Cap 44 contains the rigid portion 34 of track 26 and has a nipple 48 to which tube 32 connects. Bracket 40 is provided with an extension 50 adapted to be connected to a support S (FIG. 4).

Body members 38, 40, and 44 define internal slotting 52, 54, and 56. A shuttle 58 is slidably received in slot 52 and slot 56 provides a way for a sliding gate 60. A plate 62 slidably disposed in slot 54 is connected to slides 58 and 60. Referring to FIG. 8 the connection between shuttle 58 and plate 62 comprises lugs 64 on the shuttle engaged within openings 66 in the plate. Gate 60 has lugs 68, 70 and slots 72, 73 interengaged respectively with slots 74, 76 and lugs 78, 80 on plate 62.

Plate 62 is reciprocated by a piston 82 within a pneumatic cylinder 84 in block 38, the piston having a rod 86 connected to a crosshead 88 provided with a lug 90 engaged within an opening 92 in plate 62.

Cylinder 84 is closed by a cap 94 secured to block 38 by cap screws 96, cap 94 being provided with a threaded opening 98 for the reception of a fitting 100 through which air under pressure is introduced into the cylinder. Piston 82 is moved from the broken-line position of FIG. 5 to the solid-line position thereof by air under pressure introduced into cylinder 84, and the piston is returned by a coil spring 102 when air pressure in the cylinder is relieved. Upon these movements of the piston, shuttle 58 and gate 60 are reciprocated relative to feeder body 36.

Figure 3:
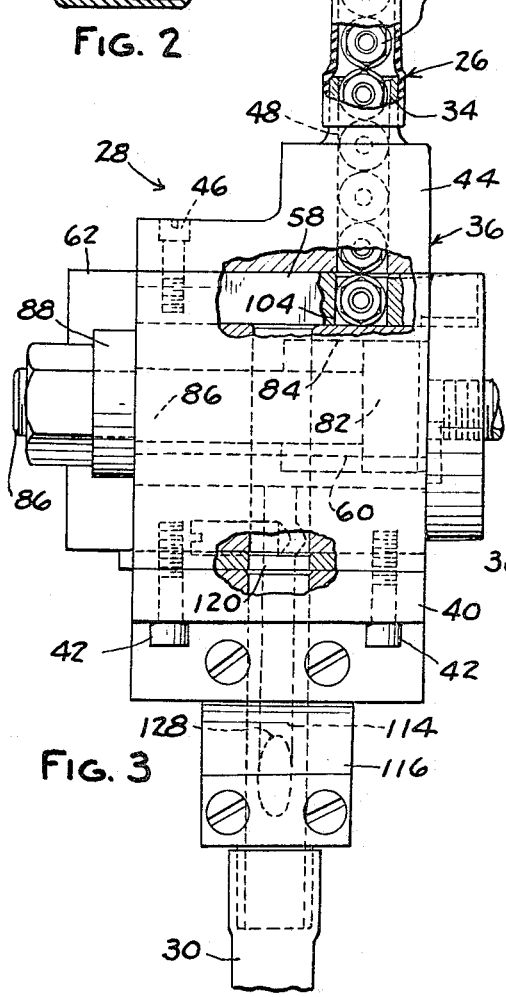
FIG. 3 is, in general, an enlarged, top plan view of the feeding mechanism with parts shown in section and in phantom to illustrate structural details.
Figure 5:
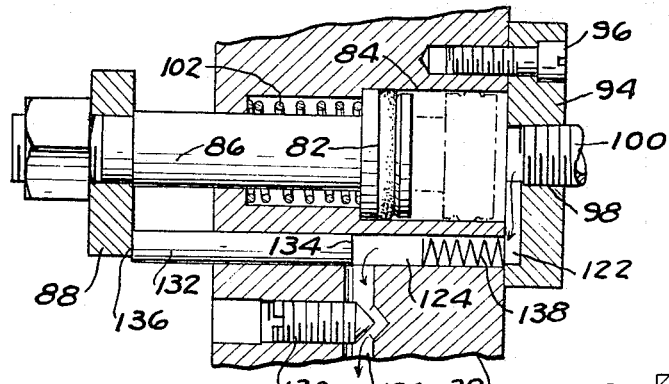
FIG. 5 is a fragmentary, sectional view on line 5—5 of FIG. 4.

Shuttle 58 is provided with an opening 104 which is aligned with track portion 34 when the shuttle and piston 82 are in the right-hand position, as FIGS. 3 and 5 are viewed. Opening 104 extends entirely from the top through the bottom of shuttle 58 and has just sufficient depth to receive an article 24 from track portion 34. When the shuttle moves to the left, as FIG. 3 is viewed, it carries the article transversely away from the track into alignment with the upper end 106 of a guideway 108 having an upper portion 110 which passes through block 38, an intermediate portion 112 which passes through bracket 40, and a lower portion 114 which passes through an outlet element 116 secured beneath bracket 40 by suitable bolting (not shown).

Figure 6:
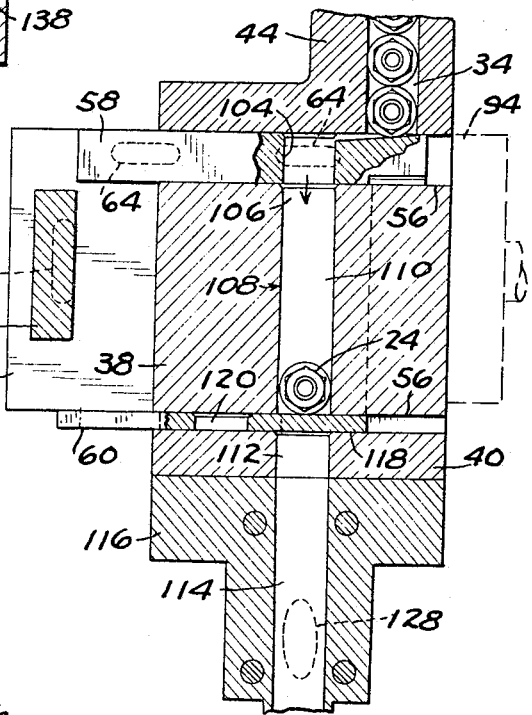
FIG. 6 is a sectional view on line 6—6 of FIG. 4.
Figure 7:
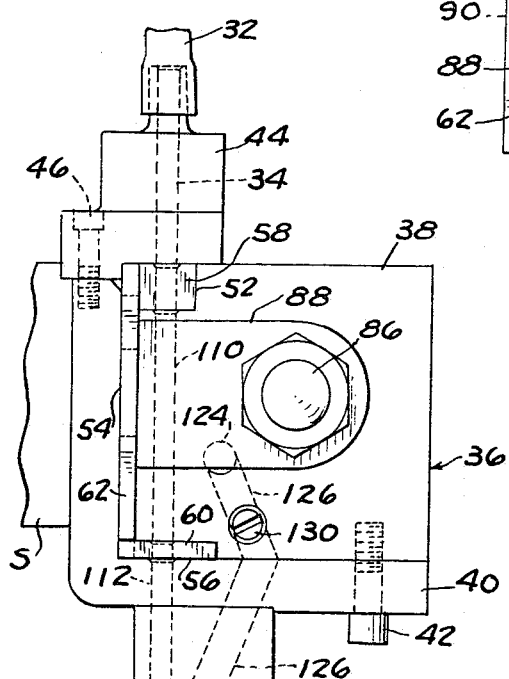
FIG. 7 is, in general, an elevation of the opposite side of the feeder device from that shown in FIG. 4.

Gate 60 is disposed between guideway portions 110 and 112, as best shown in FIG. 6. The gate has a portion 118 which extends across and closes guideway 108 when shuttle 58 is in position for delivering an article 24 into the guideway as shown in FIG. 6. The gate has an opening 120 which aligns with the guideway, as shown in FIG. 3, when shuttle opening 104 is in position for receiving an article from track portion 34.

As shown in the drawings, chamfering is provided at the upstream edges of opening 104, guideway portions 108, 112, and 114, and gate opening 120 to eliminate surfaces which an article entering the same might catch on.

Cylinder cap 94 has an internal slot 122 which communicates with a passageway 124 in block 38 (FIG. 5). Passageway 124, in turn, communicates with a passageway 126 having portions which extend through bracket 40 and outlet element 116. Passageway 126 opens into the lower portion 114 of guideway 108 at 128. A metering screw 130 is provided in block 38 for metering the flow of air through passageway 126.

A pin 132 slidably disposed in passageway 124 provides a valve which opens and closes passageway 126 to the flow of air from passageway 124. Pin 132 has an inner end 134 exposed to the pressure of air in passageway 124 and thereby forming a piston head. Pin 132 has an outer end 136 which abuts against crosshead 88 on piston rod 86. A spring 138 in the upstream end of passageway 124 prevents pin end 134 from bottoming against cap 94, thereby insuring that the pin end will be subjected to the pressure of air admitted through nipple 100.

Slide 58 has a top recessed portion 140 which adjoins opening 104 at 142 and which extends away from the opening in a direction opposite to the direction in which the slide moves from track 34 toward guideway 108. Juncture 142 is disposed low enough so that it passes under and remains out of engagement with an article in the track next above the one received in opening 104. Recessed surface 140, progressing from juncture 142 in a direction away from opening 104, slopes upwardly toward the general top surface 144 of the shuttle. In the structure illustrated in FIG. 10, this slope is substantially uniform. The structures shown in FIGS. 11 and 12 are, in general, similar, except that in FIG. 11 the slope of recessed surface 140A is non-uniform and in FIG. 12 recessed surface 140B is not sloped but extends generally parallel to the direction of movement of the shuttle.

In use, it may be assumed that hopper 22 is in operation and that a series of articles 24 have been introduced into track 26. The air pressure in cylinder 84 is atmospheric, and piston 82 and shuttle 58 are in the right-hand end of the cylinder, as FIGS. 3 and 5 are viewed. Shuttle opening 104 is aligned with track portion 34; and since the track slopes downwardly, the lead article in the track has fallen into opening 104.

Upon demand at a delivery point to which tube 30 extends, suitable valving (not shown) is actuated to introduce air under pressure into cylinder 84, thereby forcing piston 82 and shuttle 58 to the left and aligning shuttle opening 104 with upper end 106 of guideway 108. At the same time, gate portion 118 moves to the left and closes guideway 108. The article in opening 104 drops through guideway portion 110 and onto gate portion 118. When the pressure in cylinder 84 is relieved, piston 82, shuttle 58, and gate 60 are returned to the right and another article 24 drops into opening 104. At the same time, gate opening 120 aligns with guideway 108, thereby permitting the article in the guideway to drop through guideway portion 114 past compressed air outlet 128 and into tube 30.

In the subsequent cycle, compresseed air introduced into guideway portion 114 and tube 30 through outlet 128 propels to the delivery point the article 24 previously deposited in the tube. More particularly, in each cycle of operation, air under pressure in cylinder 84 passes through slot 122 into passageway 124 and forces pin 134 to the left, as Fig. 5 is viewed, so that the pin follows movement of crosshead 88 on the piston rod. After gate portion 118 has closed guideway 108, pin end 134 clears the juncture of passageways 124 and 126 so that air under pressure passes through passageway 126 and outlet 128 into the lower portion of the guideway and into tube 30. The amount of propelling air admitted to tube 30 can be regulated by means of metering screw 130.

Gate portion 118 peneumatically closes guideway portion 112 so that the propelling air is forced through tube 30 and so that an article 24 deposited in upper guideway portion 110 is protected from the influence of the propelling air. When the pressure in cylinder 84 is relieved, crosshead 88 returns pin 132 and closes passageway 126 to insure that no compressed air will pass therethrough until guideway 108 is closed by gate portion 118 in the subsequent cycle of operation.

If upper surface portion 140 of shuttle 58 were not recessed downwardly, juncture 142 would contact the leading article in track portion 34 rather sharply as it passed between that article and the one in opening 104. The impact would be transmitted through the entire train of articles in the track; and in the feeding of some parts, such as the flanged nut shown, such an impact is undesirable. The tolerances between the inner surfaces of track portion 34 and the articles are, in many cases, quite close. A sharp impact against the leading nut tends to cause the parts to bind or become locked within track portion 34. The recessing of slide surface 140 avoids any possibility of such an impact and permits the leading article in track portion 34 to lower somewhat gradually onto surface portion 140 as the article in opening 104 moves out from underneath it.

Some parts tend to interlock in passing through track 26. This is true, for example, with the combined nut and washer illustrated in the drawings. Specifically, the washers tend to overlap each other. It has been found that by joggling the train of parts in the track slightly during each cycle of operation of feeder device 28, the parts are kept in a loosened condition relative to each other and do not interlock in such a way as to interfere with their proper feeding. It is for the purpose of providing this slight joggling movement that shuttle surface 140 is sloped. As shuttle 58 completes its leftward movement, inclined surface 140 pushes lead article 24 in the track upwardly in a relatively gradual, gentle manner, and this movement is transmitted up the train of articles in the track. The surface may either have a uniform slope, as in Fig. 10, or may have a non-uniform slope, as in Fig. 11, depending on the nature of the joggling motion desired.

Where the parts being fed have no tendency to interlock in the track, such as is the case with ordinary nuts, the recessed surface need not be sloped or inclined but can be parallel to the top of shuttle 58 as shown at 140B in Fig. 12.

The surfaces defining track portion 34, opening 104, and guideway 108 all have relatively close tolerances with respect to articles 24 being fed therethrough for the purpose of maintaining them in their desired attitude and preventing them from tilting or cocking therein. Such tilting or cocking would result in a likelihood of the part becoming jammed within the feeder device.

To the contrary, the interior surfaces of tube 30 have considerably greater tolerance with respect to articles 24. This tolerance is still small enough to maintain the article in its sideways orientation as it passes through the tube but is great enough to allow the tube to be passed around relatively sharp corners without binding on the articles passing therethrough. Also, this greater tolerance permits a significant amount of the propelling air in the tube to escape past an article being propelled. This reduces the amount of propelling force on the article and prevents its acceleration to a velocity so great that it would damage itself or equipment to which it is delivered at the delivery point.

Tolerances between articles 24 and track portion 32 need not be as close as the tolerances at rigid track portion 34. Advantageously, track portion 32 can be formed of tubing identical to tubing 30.

In passing through feeder device 28, an article moves through a series of relatively short distances so that the device can be cycled rapidly with assurance that a part will be deposited in tube 30 during each cycle. Specifically, an article first drops a short distance into opening 104. Then it is carried a short distance to guideway 108. Then it falls a short distance onto gate portion 118, and finally it falls a short distance past compressed air outlet 128. The time required for movement of the part through each of these steps is small. Therefore, the device can be cycled rapidly.

The feeder device illustrated is capable of sustained reliable operation through tens of thousands of cycles at a cyclic rate of about 100 per minute. However, in actual use, the feeder is normally coordinated with a powered nut runner or the like which cannot apply the articles to a work as rapidly as the feeder can feed them. Actual nut feeders in accordance with this invention operate over sustained periods at a rate of between 60 and 70 cycles per minute.

Feeding system 20 can be mounted at floor or table level at any convenient location and need not be immediately adjacent the equipment to which articles 24 are delivered by tube 30. In numerous applications, the hopper and feeder device have been installed up to 20' away from the delivery point. Tube 30 can be passed around corners, up over obstacles, and down to a delivery point or through almost any tortuous path. The delivery end of tube 30 need not be attached to stationary equipment but can be attached to mobile equipment, since the tube can flex to follow movements of such equipment. The tube can be twisted to deliver articles in any rotative orientation relative to that in which it passes through feeder device 28.

I claim:

1. Apparatus for feeding one at a time from a source to a delivery point a series of articles, each having surface portions by engagement with which said article is orientable in a predetermined attitude, said apparatus comprising:

a track, and means operable to introduce said articles into said track in a predetermined attitude, a transfer movable laterally of said track and having an opening which in one position of said transfer is aligned for reception of an article from said track, and in another position is displaced from said track, means defining a guideway positioned for reception of an article from said opening in said other position of said transfer, said guideway extending downwardly so that a received article passes gravitationally therethrough, a flexible tube having a longitudinal passageway therein extending to said delivery point, means mounting said tube so that said passageway is positioned to receive an article from said guideway, said track, transfer opening, guideway, and passageway having control surfaces which are operative by engagement with said surface portions of said articles to hold the same in their predetermined attitude, a closure movable laterally to and from alignment with an intermediate portion of said guideway and being thereby operative to close and open said guideway, motor means operable to move said transfer and closure so that said transfer opening and closure are moved to and from alignment with said guideway substantially simultaneously, means operable when said closure is aligned with said guideway to introduce air under pressure into a portion of said guideway below said closure for propelling an article through said passageway to said delivery point, and to discontinue said pressure when said closure is retracted from said guideway, said closure, when in alignment with said guideway, providing a transitional support for an article received from said transfer and a pneumatic closure for containing said air under pressure, the control surfaces of said passageway having relatively larger tolerances with respect to said surface portions of said articles than control surfaces upstream thereof to facilitate curving of said tube without binding against articles passing therethrough and to facilitate escape of air past articles propelled thereby in said tube.

2. The apparatus defined in claim 1 wherein at least a portion of said track comprises a flexible tube having a longitudinal passageway therein which extends between said means operable to introduce said articles and said transfer.

3. The apparatus defined in claim 2 wherein said first and second mentioned flexible tubes have substantially identical cross sectional configuration.

4. The apparatus defined in claim 2 wherein said means operable to introduce said articles comprises a hopper which introduces said articles into an end portion of the second-mentioned tube, the portion of said track adjacent said transfer being substantially inflexible, the second-mentioned tube having another end portion which connects with said substantially inflexible track portion.

5. Apparatus for feeding articles one at a time from a source to a delivery point comprising:

a track, and means operable to introduce said articles into said track in a predetermined attitude with respect to their direction of travel, a body to which said track is connected, a slide mounted on said body for reciprocation between one position and another position, said body having a guideway displaced laterally from the connection between said track and body, said slide having a receptacle which, in one position of said slide is aligned for reception of an article from said track and which, in the other position of said slide, is aligned for delivery of the received article to said guideway, said guideway extending downwardly from said slide so that a received article passes gravitationally therethrough, said body having a way intersecting said guideway and within which is a gate mounted for reciprocation to one position in which it is in closing relation to said guideway and to another position in which said guideway is opened, said gate providing transitional support for an article received in said guideway when said gate is in closing relation to said guideway, motor means operable to reciprocate said slide and gate to said one position and other position in respectively alternative sequence so that articles are transferred successively from said track to said receptacle, then to supported relation on said gate, and then past said gate to portions of said guideway downstream thereof, a flexible tube having a longitudinal passageway therein extending to said delivery point, means mounting said tube so that said passageway is positioned to receive an article from said guideway, and means on said body operable to admit air under pressure into said downstream portions of said guideway when said gate portion is in closing relation thereto, said gate portion in said closing relation providing a pneumatic closure for said guideway, said track, receptacle, guideway, and passageway having surface portions operative by engagement with portions of said articles to maintain the same in said predetermined attitude during delivery from said track to said delivery point.

6. The apparatus defined in claim 5 wherein said slide and gate have a common mechanical connection with said motor means through which said slide and gate are reciprocated substantially in unison.

7. Feeding apparatus comprising:
a track adapted to receive and hold a series of articles in abutting relation, said track having an exit for articles therein, a transfer mounted for movement laterally of the track, said transfer having an opening which, in one position of the transfer, is aligned with said exit for reception of an article from said track and which, in another position of the transfer, is displaced from said exit for discharging the article therein, said transfer having a portion which, in said one position, is laterally adjacent said exit and which moves across said exit upon movement of said transfer to said other position for obstructing passage of subsequent articles in the series through said exit, said transfer portion having a recessed surface which adjoins and extends away from said opening in a direction opposite to the direction of movement of said transfer from said one position to said other position, so that said transfer portion remains free of contact with an article in said track until the preceding article has been moved at least partially away from alignment with said exit.

8. The apparatus defined in claim 7 wherein said recessed surface is sloped in a direction toward said exit, progressing from the juncture of said opening and recessed surface in said opposite direction, so that upon completion of movement of said transfer toward said other position thereof, portions of said recessed surface engage an article in said track adjacent said exit and thereby impart slight joggling movement to the articles in said track.

9. The apparatus defined in claim 8 wherein said slope is substantially uniform.

10. The apparatus defined in claim 8 wherein said slope is non-uniform.

11. The apparatus defined in claim 8 wherein said recessed surface extends substantially parallel to the direction of movement of said transfer.

12. Apparatus for feeding one at a time from a source to a delivery point a series of articles, such as nuts, washers, slugs, and the like having basically disc-like configuration, said apparatus comprising:

a track, and means operable to introduce a series of said articles into said track in a predetermined attitude with respect to their direction of travel, a flexible tube having a longitudinal passageway therein extending to said delivery point, and a device operable to transfer articles one at a time from said track into said tube, said device including a body to which said track and tube are connected, a guideway within said body having an upper end portion laterally displaced from the connection between said track and body and extending downwardly to a lower end portion which is aligned for delivery of an article therein to said passageway in said tube, a shuttle reciprocably mounted on said body and having an opening which, in one position of said shuttle, is aligned for reception of a single article from said track and which, in another position of said shuttle, is aligned for delivery of the received article to the upper end of said guideway, a gate operable to close and open an intermediate portion of said guideway, motor means operable to coordinate the movements of said shuttle and gate so that said gate is closed when said shuttle is in its article-delivering position and said gate is open when said shuttle is in its article-receiving position, said gate in closed condition providing temporary support for an article in said guideway, means operable to admit air under pressure into said guideway downwardly of said gate when said gate is closed, said gate providing a pneumatic closure for upper portions of said guideway, thereby causing the air under pressure to propel an article in said tube to said delivery point, at least portions of said track, said opening, and said guideway having rectangularly disposed surface portions with tolerances which are relatively close with respect to portions of said articles for maintaining said articles in their predetermined attitude in passing to said passageway and tube, said passageway having rectangularly disposed surface portions operable by engagement with surface portions of said articles to maintain said articles in their predetermined attitude, said passageway surface portions having relatively great tolerance with respect to the surface portions of the articles to facilitate curving of said tube without binding against articles passing therethrough and to facilitate escape of air past articles propelled thereby in said tube.

References Cited by the Examiner

UNITED STATES PATENTS

| | | | |
|---|---|---|---|
| 2,186,841 | 1/1940 | Rylander | 221—236 |
| 2,534,140 | 12/1950 | Moore | 221—278 |
| 2,540,604 | 2/1951 | Van Sittert et al. | 221—278 |
| 2,544,165 | 3/1951 | Krasnow | 221—299 |
| 2,950,026 | 8/1960 | Collazzo et al. | 221—175 |
| 3,038,637 | 6/1962 | Zakrzewski et al. | 221—278 |
| 3,163,324 | 12/1964 | Lupo | 221—278 |

ROBERT B. REEVES, *Primary Examiner.*

W. SOBIN, *Assistant Examiner.*